UNITED STATES PATENT OFFICE.

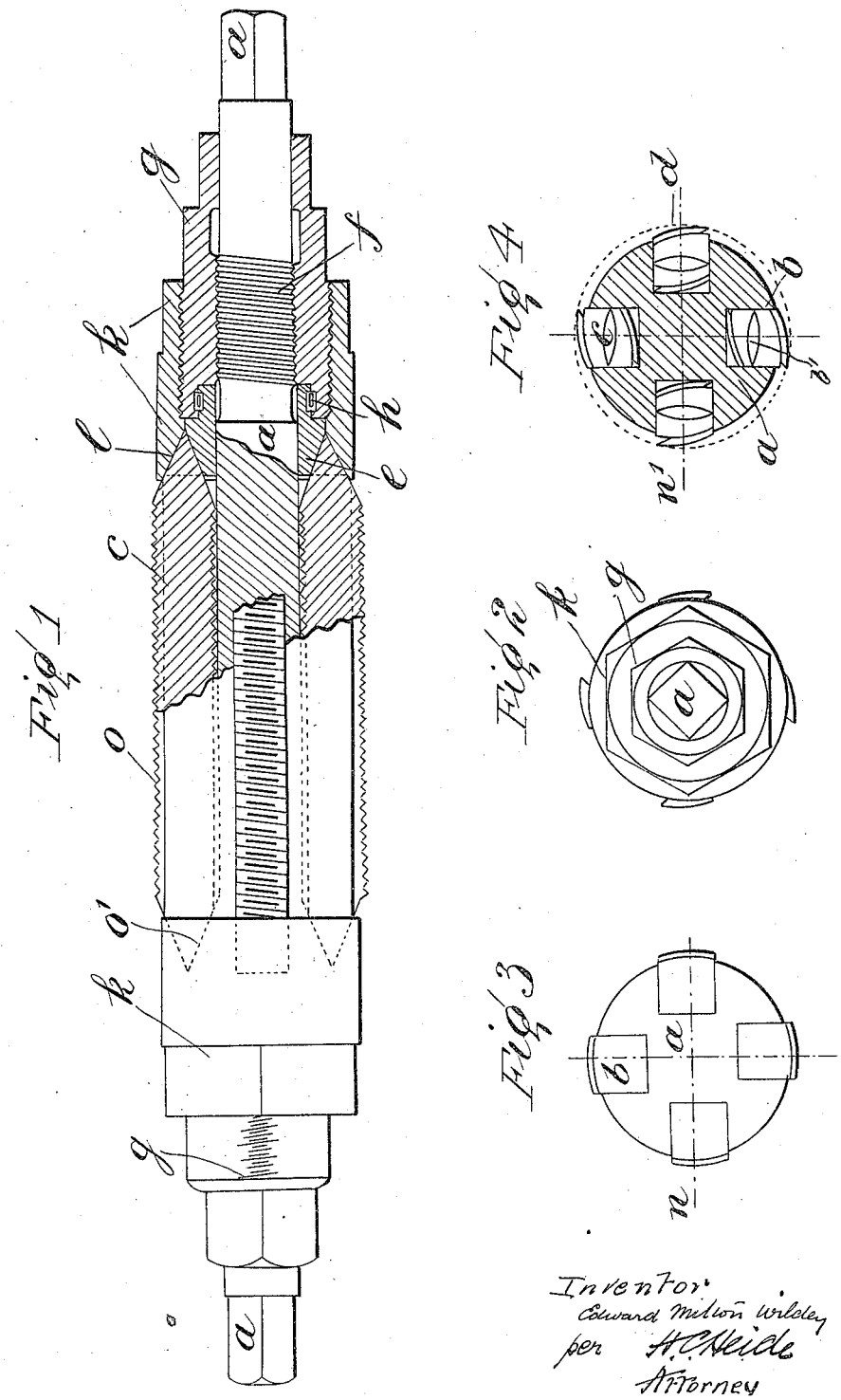

EDWARD MILTON WILDEY, OF CANONBURY, LONDON, ENGLAND.

TAP FOR CUTTING SCREW-THREADS.

1,307,103.      Specification of Letters Patent.      Patented June 17, 1919.

Application filed December 4, 1917. Serial No. 205,445.

*To all whom it may concern:*

Be it known that I, EDWARD MILTON WILDEY, a subject of His Majesty King George V of the United Kingdom of Great Britain and Ireland and of the British Dominions Beyond the Sea and Emperor of India, residing at Canonbury, London, England, have invented certain new and useful Improvements in Taps for Cutting Screw-Threads, of which the following is a specification.

The present invention relates to a class of tap in which a number of radially adjustable threaded steel cutters (four for example) are arranged circumferentially on a supporting bar or core, the threaded steel cutters being at equal distance apart on the circumference of the core, and each cutter in a groove cut in the core, so that the axes of all the cutters are parallel with the axis of the core.

The present invention embodies an improved mode of obtaining the known sloping back or true clearance of the cutting edges, and also an improved parallel adjustment for controlling the diameter of the cutters, this improved parallel adjustment among other advantages making a tap of relatively slender build and a long entering slope practicable, as a tap of the long slope character and adapted for rapid machine work—commonly known as a machine tap.

According to the present invention a tap having a multiplicity of longitudinal threaded cutters with relief or true clearance on the trailing aspect of the threaded faces of the cutters has a parallel adjustment by a double cone and differential mechanism for controlling the diameter of the cutters.

In the tap hereinafter described in detail with reference to the accompanying drawings, relief or true clearance is realized by cutting the threads on a spindle chuck or chuck so contrived with tangential difference as to give the required relief to the threads, but the invention is not to be considered as limited to this or any mode of obtaining the required relief or clearance to the threads.

As conducing to a good understanding of the present improved adjustable tap it may be observed that in using the ordinary taps for cutting screw threads, it is found that owing to wear the teeth lose their original shape this loss being due to the want of clearance or relief on that trailing portion which follows a cutting or operative edge. This wear takes place on the tooth-tops, and although the worn teeth may be sharpened, the fact that their height has been reduced by wear makes it impossible for the teeth to cut to the same depth as before: hence the tap becomes defective and useless for accurate work.

It will be understood that under the present invention a tap is produced which will retain the original shape of its teeth until it is worn out or exhausted by repeated grindings, in other words, a tap in which the wear is taken by the cutting edges only, the top of the teeth beyond, behind or trailing from the cutting edge being set back toward the axis of the core. When the cutting edges of a tap of this kind are sharpened by grinding, the effective diameter of the tap is reduced and the present invention provides ready, exact, measured and controlled means of restoring or adjusting the diameter, thus extending the life or lastingness of the tap.

The invention is illustrated in the accompanying drawings, Figure 1 being a longitudinal section, Fig. 2 an end view of a tap, Fig. 3 a transverse section through a threading chuck or body and Fig. 4 a transverse section through the tap shown by Figs. 1 and 2.

The device employed for the above purposes consists of a suitably shaped supporting bar or core $a$, Fig. 1, formed preferably from a piece of round steel, this being longitudinally grooved with an expedient number (four for example) of grooves $b$, the section of the grooved part being shown by Fig. 4, in which $a$ represents the medial part of the body or core in cross-section, and $b$ one of the grooves. In each groove $b$ Figs. 1 and 4 there is supported and steadied a threaded cutter $c$, Figs. 1 and 4, preferably made on steel of square section, the teeth being shown by $o$ Fig. 1. The inner support of the cutters $c$, Fig. 4, consists of two male cones, one of which is shown by $e$, Fig. 1. The male cones $e$ are made a sliding fit on those smooth portions or shanks of the supporting bar or core $a$, Fig. 1, which are beyond the medial grooved portions of the core and the forward parts of the male cones $e$ mesh into the medial grooved portions of the core; being thus prevented from turning under the action of the cone-nuts hereinafter described. The function of the male cone $e$ is to drive the threaded cutters outward by approach of the cones, or to allow the cutter to recede by wider separation of the cones. The smooth portions or shanks of the core on which the male cones slide is conveniently of the same diameter as the diameter measured from the bottom of the grooves and beyond the smooth portion and toward each end respectively the core is threaded, one end right-handed and the other end left handed, but in Fig. 1 only one of these threadings is shown, namely at $f$. Each of these threaded portions carries a sleeve-like nut $g$ which is herein termed as a cone nut. The cone nut is linked to its male cone $e$ by a joint shown at $h$ Fig. 1, which joint allows of a free turning of the cone nut against its cone, and by means of appropriate grooves and keying provides for a pull-back of the male cone $e$ when the cone nut recedes.

In that inter-relation of the male cone to its nut, which is preferred, a groove $h$ embracing both parts is employed and in this groove is a spring ring or flexible strip, or such other part as may insure withdrawal of the cone as well as push forward. Any equivalent device may be adopted; as for example, the groove only in the male cone piece $e$ and a stud or grub screw through the cone nut $g$, and engaging in the groove.

The outer surface of each cone nut carries an external thread of coarser pitch than the inside thread, and in each case the thread is of the like hand in relation to the inside thread of the same cone nut. On the outside of each cone nut there runs or works by the medium of the outside thread, a sleeve nut $k$, the inner end of which is shaped to a bell mouth or female cone as shown at $l$, this being one of the two companion nuts called bell nuts.

The four threaded cutters $c$ are thus gripped between the male cones $e$, and the bell nuts $k$, the ends of the cutters being appropriately chamfered or sloped for this purpose, and the chamfering may be such as allows, two or four positions for each cutter, so that four separate tap systems or rates may be embodied in the device if desirable, or four similar taps in multiplica. Thus the tap may embody four different pitches, if wished, provided that all four faces of each cutter are appropriately threaded. There may be obvious advantages on the score of steadiness in confining the threads to two opposite faces of the cutters as shown by Fig. 4, $c$ representing one of the cutters, and $d$ one of the threaded parts.

In threading the cutters it may be expedient to employ a spindle chuck or holder generally resemblant to the device as shown by Fig. 1 but so contrived as to provide for the required clearance of the trailing threads. To provide for so cutting as to give the required clearance, various mechanical devices suggest themselves that preferred being to so adjust or plot the grooves in the ultimate core or body and in the body or chuck on which the cutters are threaded that the planes forming the bottom of the respective grooves in the two systems shall have such tangential relation to each other as to allow for the trailing end of the threads to be nearer to the axis of the core, when the cutters are finally mounted in the complete device; the inventor, however, in defining this condition of the finished invention, contents himself with indicating one precedure for its realization or construction. The relief on the threads of the complete tool is shown or illustrated by Fig. 4, this figure referring to an ordinary or right handed tap.

Fig. 3 shows a chuck or body suited for use in threading the set of cutters, the grooving being so plotted that the medial point in a line as shown forming the bottom of a groove is not a tangent point of this line on any circle struck from the axis of the stem; the tangent point of such line to such circle being more toward that aspect of the prospective teeth which is to bear onward when the teeth are cut.

By the system of cross dotted lines, Fig. 3, $n$ shows the departure from the tangential condition on the chuck for threading, and the system of cross dotted lines Fig. 4, $n'$ shows the medial point of the line forming the bottom of a groove is strictly a tangent point of this line on a circle of the appropriate diameter struck from a point in the section of the axis of the chuck. Fig. 4 also clearly shows the relief on the trailing portion of the threaded face $d$. At $b'$, Fig. 4, is indicated the shaping of the end of one of the cutters so as to coincide with, or engage with the male cone and the bell nut. This shaping is also indicated by $o'$, Fig. 1. Fig. 2 shows an end view of the tap, $a$ being the core at its square end, $g$ the hexagon end of the cone nut, and $k$ the hexagon end of the bell nut.

In order to measure or register to an exact degree of expansion, a scale or micrometer gage is engraved on one of the cone nuts as shown at Fig. 1, $g'$, and by the use of this scale, accurate dimension can be realized without inconvenient use of a ring gage.

In expanding the tap made with cones, according to the present invention, one end of the body or core is gripped in a vise, and the bell nuts are prevented from revolving; then both cone nuts are turned simultaneously, this being conveniently effected by a suitably shaped spanner. The threads of the bell nuts will cause these bell shaped parts to move in a direction opposite to that of the corresponding cones. This movement is made appropriate to the angle of the bells and cones, the contacts or chamfering of the ends of the cutters, and the outward and inward parallel movements of the cutters to and from the body or core; the micrometer scale mentioned above formed on one of the cone nuts may be conveniently so graduated that one space or grade corresponds to a diametric expansion or contraction in terms of standard measure.

What I claim is:—

1. A tap with a multiplicity of longitudinal threaded cutters which are radially adjustable, parallel adjustment means for controlling the diameter, said means comprising a double cone mechanism and differential mechanism coöperating therewith substantially as described.

2. A tap with a multiplicity of longitudinal threaded cutters with wedge-shaped ends, coned end-grips coöperating therewith, and means for differentially moving said end-grips, substantially as described.

3. A tap with a multiplicity of longitudinal threaded cutters with wedge-shaped ends, coned end-grips coöperating therewith, and controlling and actuating means for said end-grips comprising an intermediate sleeve-nut threaded inside and outside, the threads on the outside being of coarser pitch than the inside threads.

4. A tap having a core with a multiplicity of longitudinal grooves and smooth and threaded portions, a threaded cutter in each groove, chamfered ends to the cutters, inner and outer coned end-grips coöperating therewith, intermediate sleeve-nuts screwed on the aforesaid threaded portions of said core, a coarser pitch thread on the external diameter of the sleeve-nuts, said sleeve nuts controlling and actuating the said coned end-grips, substantially as described.

In testimony whereof, I affix my signature.

EDWARD MILTON WILDEY.

Copies of this patent may be obtained for five cents each, by addressing the "Commissioner of Patents, Washington, D. C."